US006832629B2

(12) United States Patent
Wu

(10) Patent No.: US 6,832,629 B2

(45) Date of Patent: Dec. 21, 2004

(54) RAPID INFLATION AND VENTING AIR VALVE OF AIRBED

(76) Inventor: Shang Neug Wu, 235 Chung-Ho Box 8-24, Taipei (TW)

( * ) Notice: Subject to any disclaimer, the term of this patent is extended or adjusted under 35 U.S.C. 154(b) by 447 days.

(21) Appl. No.: 10/107,720

(22) Filed: Mar. 28, 2002

(65) Prior Publication Data

US 2003/0183287 A1 Oct. 2, 2003

(51) Int. Cl.[7] ......................... F16K 11/02; F16K 37/00; A47C 27/08

(52) U.S. Cl. ....................... 137/625.21; 137/554; 5/713

(58) Field of Search ....................... 137/625.21, 625.22, 137/554; 60/407, 411, 412; 5/713

(56) References Cited

U.S. PATENT DOCUMENTS

| | | | | | |
|---|---|---|---|---|---|
| 5,052,067 | A | * | 10/1991 | Thomas et al. | 5/713 |
| 5,261,451 | A | * | 11/1993 | Spencer | 137/554 |
| 5,299,599 | A | * | 4/1994 | Farmer et al. | 137/625.22 |
| 5,920,934 | A | * | 7/1999 | Hannagan et al. | 5/713 |
| 5,947,168 | A | * | 9/1999 | Viard | 5/713 |
| 6,152,176 | A | * | 11/2000 | Lin | 137/625.21 |
| 6,163,909 | A | * | 12/2000 | Lin | 5/713 |
| 6,253,402 | B1 | * | 7/2001 | Lin | 5/713 |
| 6,266,833 | B1 | * | 7/2001 | Lin | 5/713 |
| 6,447,361 | B1 | * | 9/2002 | Akiyama | 137/625.21 |
| 6,530,751 | B1 | * | 3/2003 | Song et al. | 5/713 |
| 6,698,046 | B1 | * | 3/2004 | Wu | 137/625.21 |

* cited by examiner

*Primary Examiner*—John Rivell

(57) ABSTRACT

A rapid inflation and venting air valve of an airbed comprises at least one air inlet, a lower opening, cover openings, and, joint tubes; and a blower having a wind suction opening and a wind transfer tube. When the wind transfer tube is communicated with the air inlet and the joint tubes, air can be inflated into airbags. When the wind suction opening is communicated with the lower opening and the joint tubes, air can be vented out. Thereby, by only operating the rotary element, the functions of inflation and venting can be performed rapidly. As a result the object of emergency rescue is achieved. The air valve integrates the functions of inflation and venting in one unit by only one blower so as to simplify the structure and lower the cost.

3 Claims, 7 Drawing Sheets

RAPID INFLATION AND VENTING AIR VALVE OF AIRBED

FIELD OF THE INVENTION

The present invention relates to air valves, and particularly to a rapid inflation and venting air valve of an airbed, wherein a high flow blower is used. By operating a rotary element, the inflation and venting of air in the airbed can be performed rapidly.

BACKGROUND OF THE INVENTION

A medical airbed is used to prevent a patient lying on the bed for a longer time from getting bedsore. Since the patients using airbeds are series cases and they have the following problems necessary to be improved.

1. When an emergency event occurs, for performed cardiopulmonary resuscitation operation, air in the airbed must be released rapidly.

2. In the prior art, the inflation time is about 40 minutes. It is too long to be acceptable. In another prior art, a blower for being used in an airbed is developed for air inflation. However, the airbed has a plurality of air inlets and thus it is necessary to fill air into these air inlets. The operation is very complicated and more labor time is necessary.

SUMMARY OF THE INVENTION

Accordingly, the primary object of the present invention is to provide a rapid inflation and venting air valve of an airbed which comprises at least one air inlet, a lower opening, cover openings, and, joint tubes; and a blower having a wind suction opening and a wind transfer tube. When the wind transfer tube is communicated with the air inlet and the joint tubes, air can be inflated into airbags. When the wind suction opening is communicated with the lower opening and the joint tubes, air can be vented out. Thereby, by only operating the rotary element, the functions of inflation and venting can be performed rapidly. As a result, the object of emergency rescue is achieved. The air valve integrates the functions of inflation and venting in one unit by only one blower so as to simplify the structure and lower the cost.

The various objects and advantages of the present invention will be more readily understood from the following detailed description when read in conjunction with the appended drawing.

DETAILED DESCRIPTION OF THE PREFERRED EMBODIMENTS

The rapid inflation and venting air valve of an airbed of the present invention will be described in the following with the appended drawings.

Figure 1:
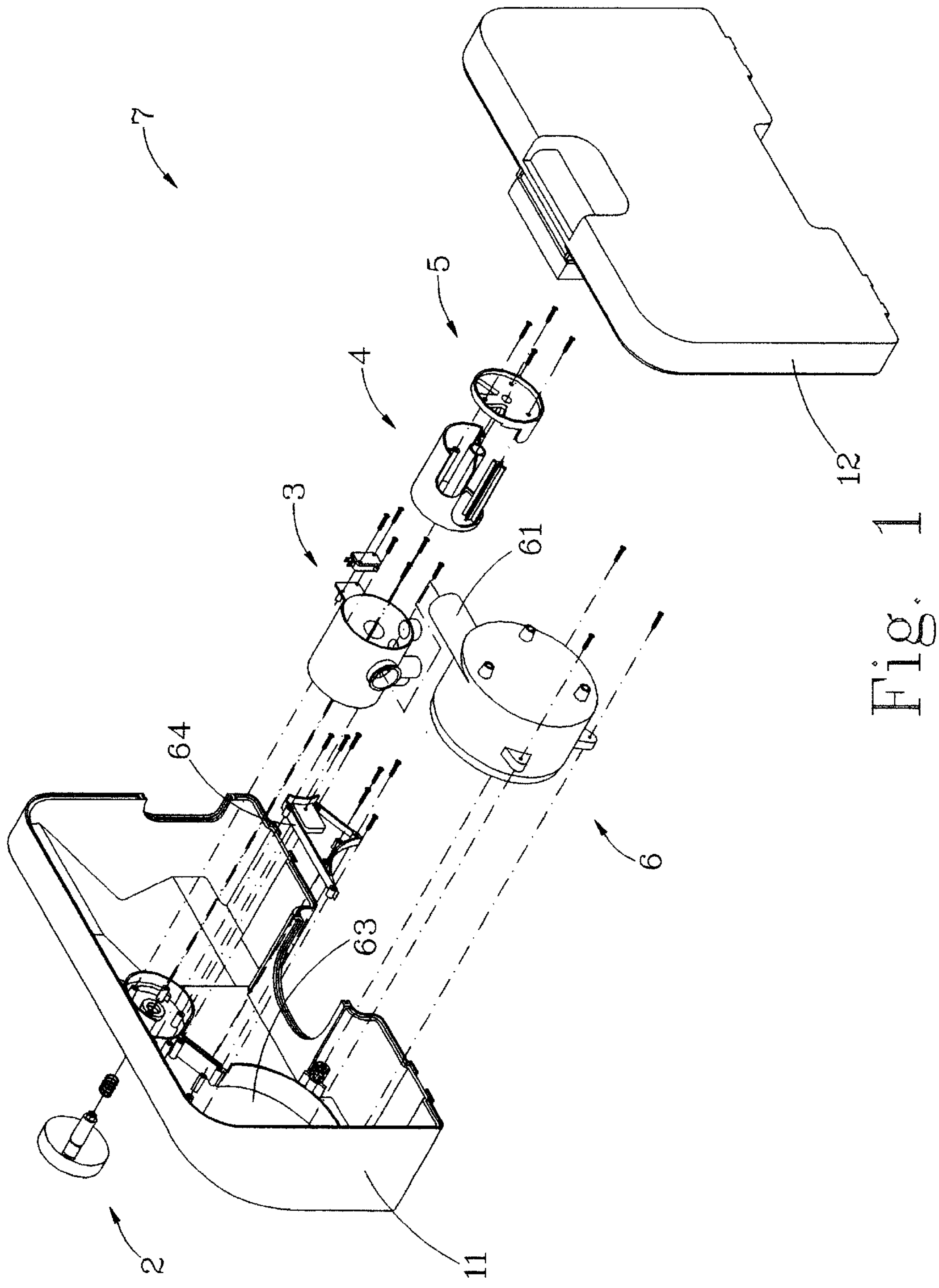
FIG. 1 is an exploded perspective view of the present invention.
Figure 2:
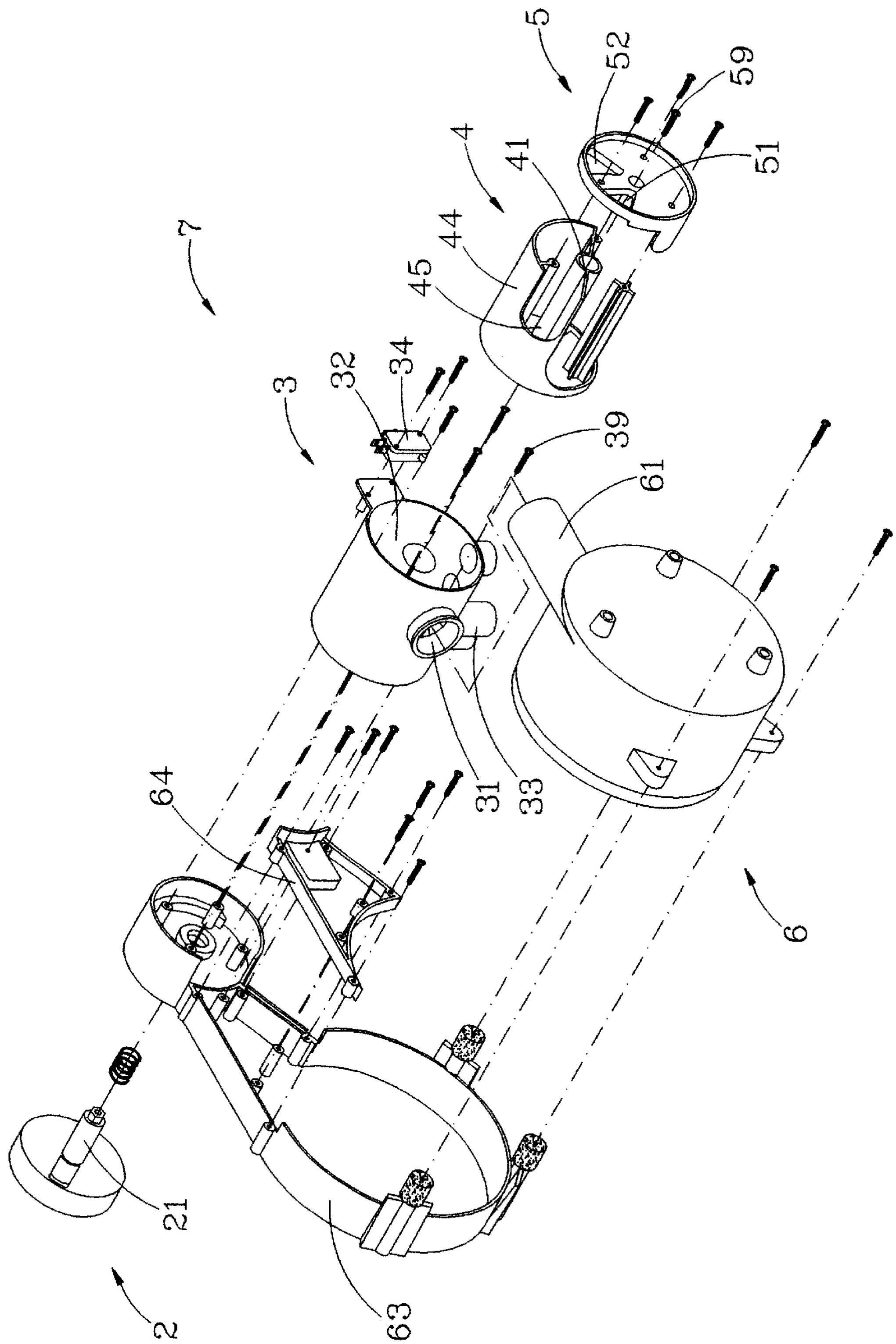
FIG. 2 is another exploded perspective view of the present invention.
Figure 3:
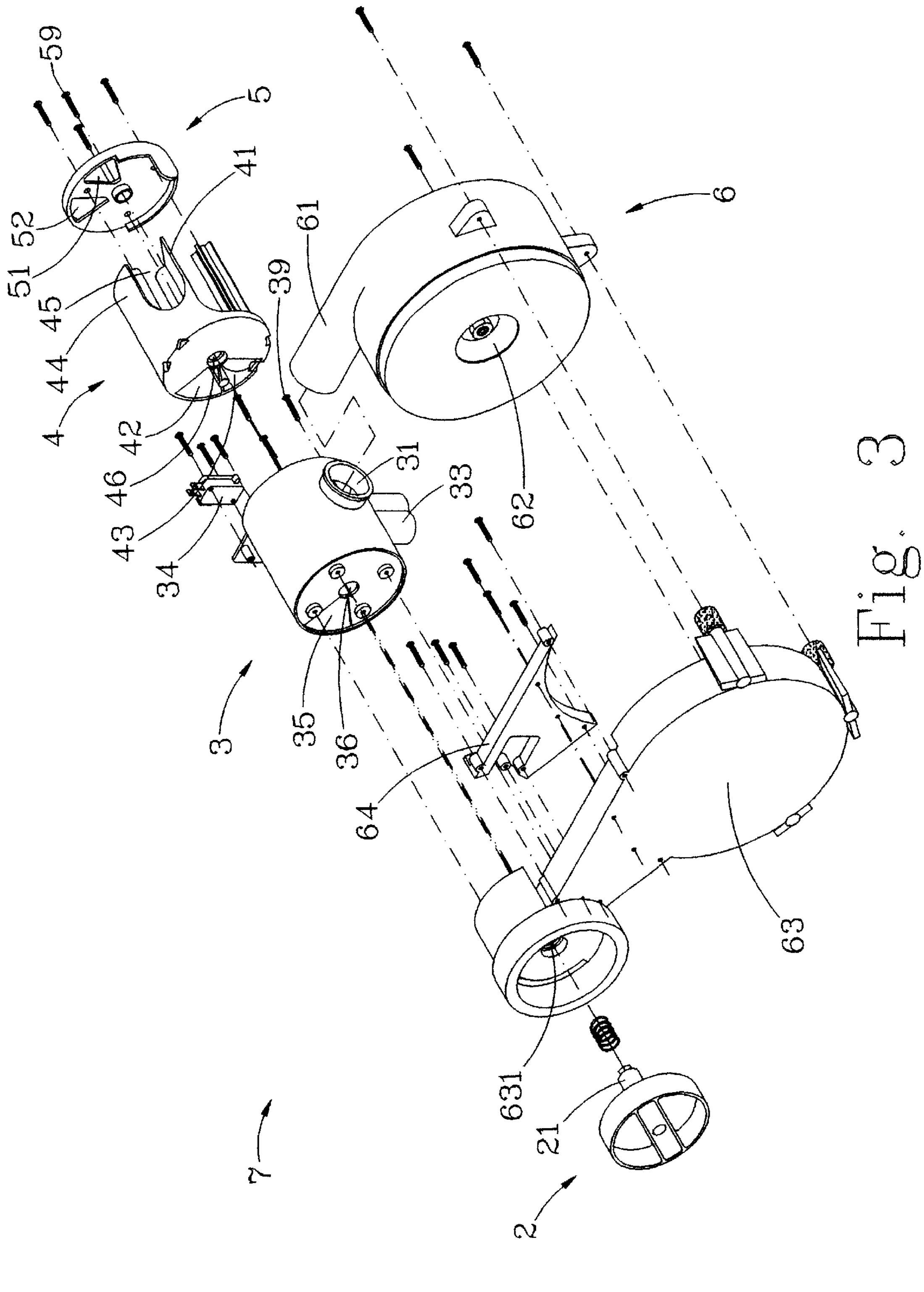
FIG. 3 is a further exploded perspective view of the present invention.

Referring to FIGS. 1, 2, and 3, the air valve 7 of the present invention includes a rotary element 2, an outer casing 3, an inner rotary body 4, and a rotary cover 5, etc. The air valve 7 must be used with a blower 6 so the two is formed as a combinational structure and then the combinational structure is installed with a first lateral cover 11 and a second lateral cover 12.

An inner side of the rotary element 2 is extended with a driving shaft 21. The driving shaft 21 passes through a predetermined portion of the first lateral cover 11 to be connected to the outer casing 3.

The outer casing 3 is a hollow tube and is horizontally arranged from the viewpoint of the drawings. A lateral side of the outer casing 3 has an air inlet 31 and a plurality of jointing tubes 33. One end of the outer casing 3 is an opening portion 32. The opposite side with respect to the opening portion 32 is a closing end. The closing end has a plurality of apertures 35 and a through hole 36. Moreover, a sensing switch 34 is installed on an edge of the lateral side of the outer casing 3.

The inner rotary body 4 has a size slightly smaller than the outer casing 3. A spacer 41 is installed in the center portion of the inner rotary body 4. A first opening 42 and a second opening 43 are formed on one end portion of the inner rotary body 4. The first opening 42 and the second opening 43 are exactly at two sides of the spacer 41. The lateral side of the inner rotary body 4 is a shroud 44 and a notch 45 is formed on the shroud 44. A driving axial hole 46 is formed on the end portion having the openings 42 and 43.

The rotary cover 5 is utilized to cover the inner rotary body 4. The rotary cover 5 exactly covers the inner rotary body 4 and then the two are assembled as one integral body. The shape of the rotary cover 5 is exactly corresponding to the opening portion 32 of the outer casing 3. The cover of the rotary cover 5 has two openings 51, 52.

An interior of the blower 6 has a motor which has fans and other components. The blower 6 has a wind transfer tube 61 and a wind suction opening 62. To actuate the blower 6 and the air valve 7, in the present invention, a wind guide mask 63 and a cover plate 64 are installed. The cover plate 64 is used to cover one end of the blower 6 having the wind suction opening 62; and the wind guide mask 63 is installed aside the cover plate 64 for guiding airflow.

In assembling the air valve 7, at first, the rotary cover 5 is locked to the inner rotary body 4 through screws 59. The outer casing 3 is locked to a predetermined position of the wind guide mask 63 through screws 39. The wind transfer tube 61 of the blower 6 is connected to the air inlet 31 of the outer casing 3. The inner rotary body 4 is placed in the outer casing 3. The driving shaft 21 of the rotary element 2 passes through the first lateral cover 11, a through hole 631 on the wind guide mask 63, the through hole 36 and then it is buckled in the driving axial hole 46.

Figure 4:
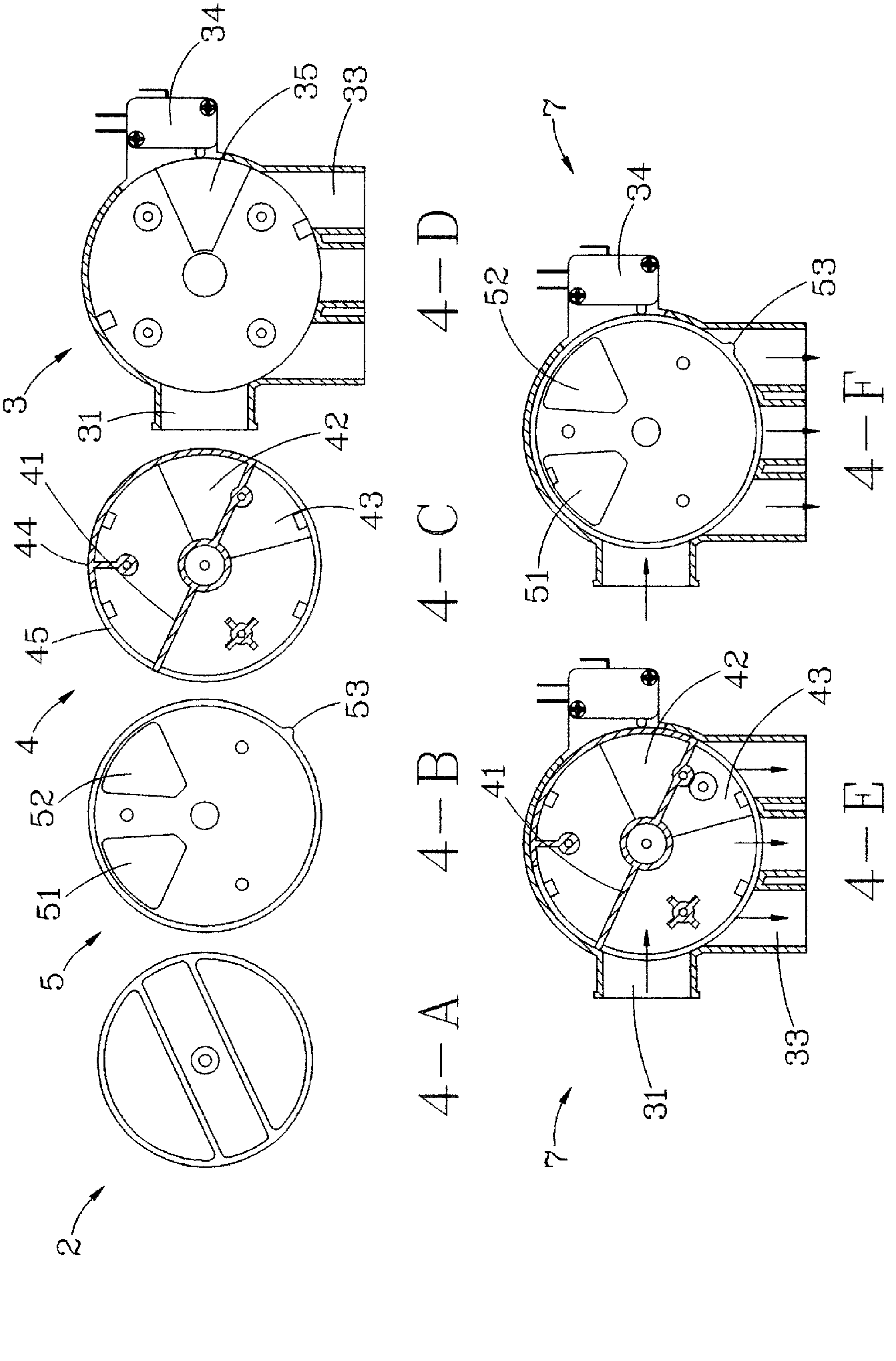
FIG. 4 is a schematic view showing the inflation operation of the present invention.
Figure 5:
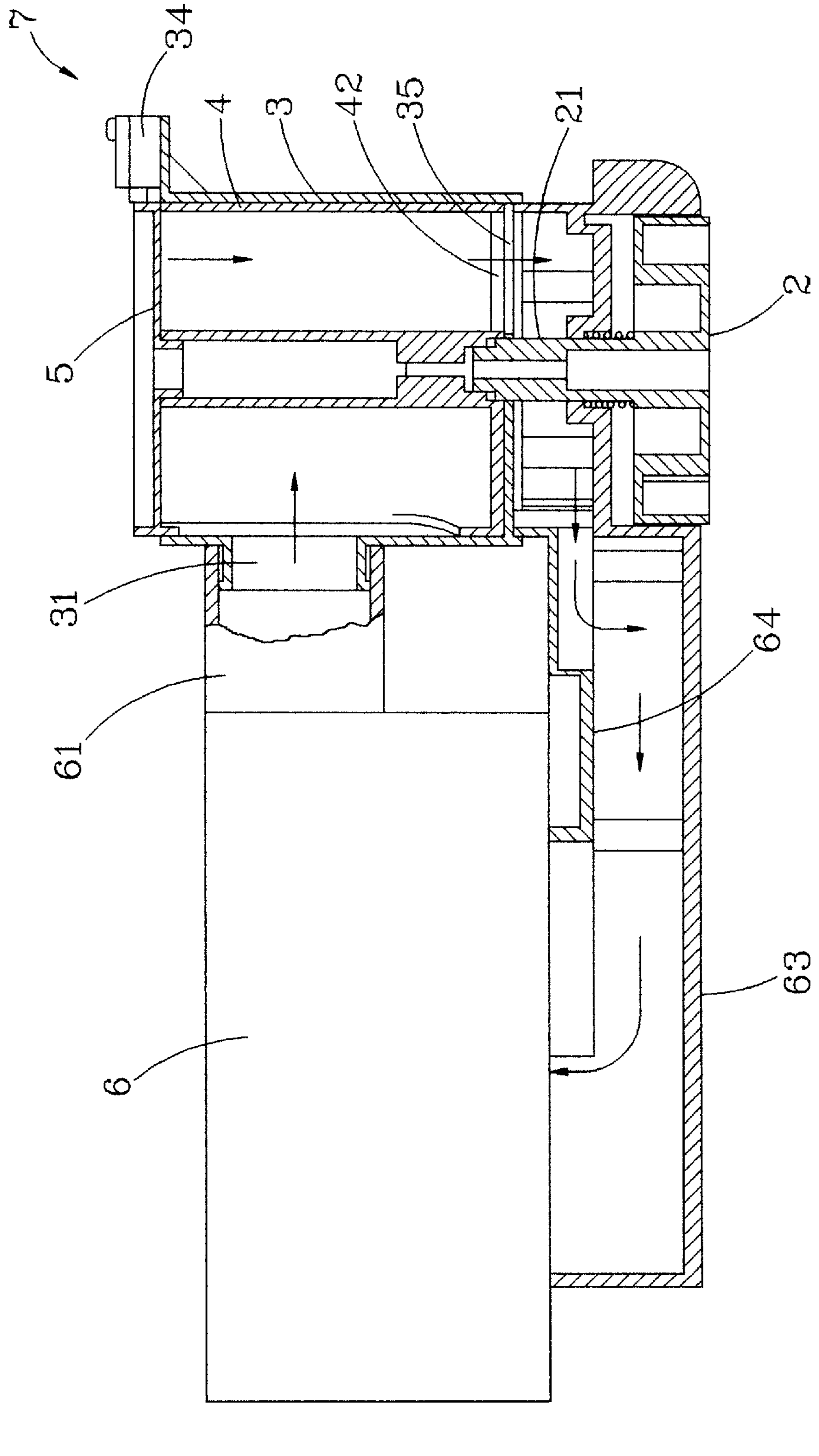
FIG. 5 is another schematic view showing the inflation operation of the present invention.

With reference to FIGS. 4 and 5, when it is desired to rapidly inflate an airbed (not shown), the rotary element 2 is placed in a normal condition. Then, by actuating the blower 6, air is sucked into the outer casing 3 from the openings 51, and 52. By the isolating effect of the spacer 41, air will flow into the wind guide mask 63 from the lower opening 35, and then passes through the wind suction opening 62 of the blower 6. Then air is outputted from the wind transfer tube 61. Next, the air is transferred to the air inlet 31 to the outer casing 3. By the isolating effect of the spacer 41, air may flow into each joint tube 33. Thereby, each airbag of the airbed is filled with air and air can be inflated rapidly.

Figure 6:
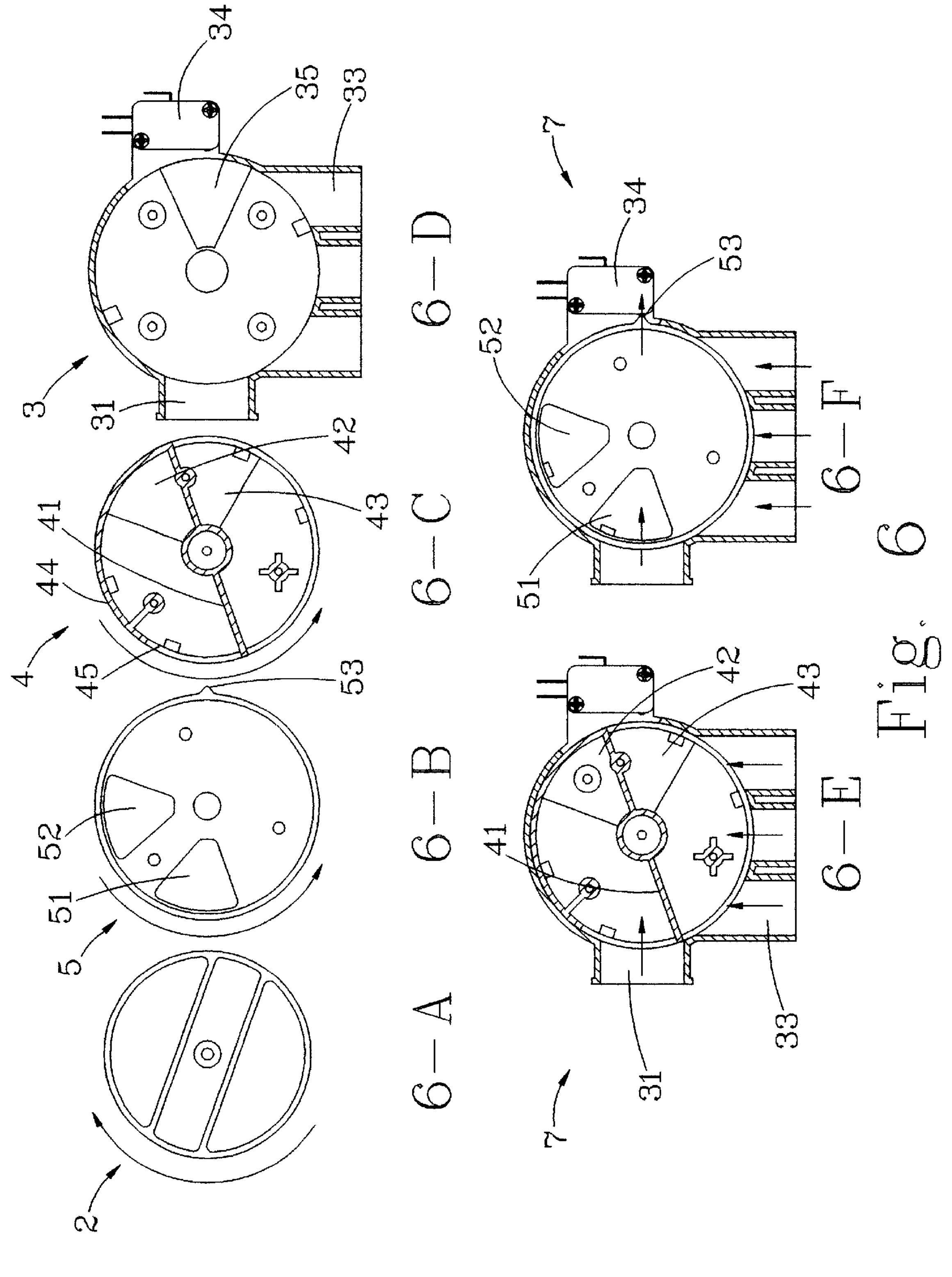
FIG. 6 is a schematic view showing the venting operation of the present invention.
Figure 7:
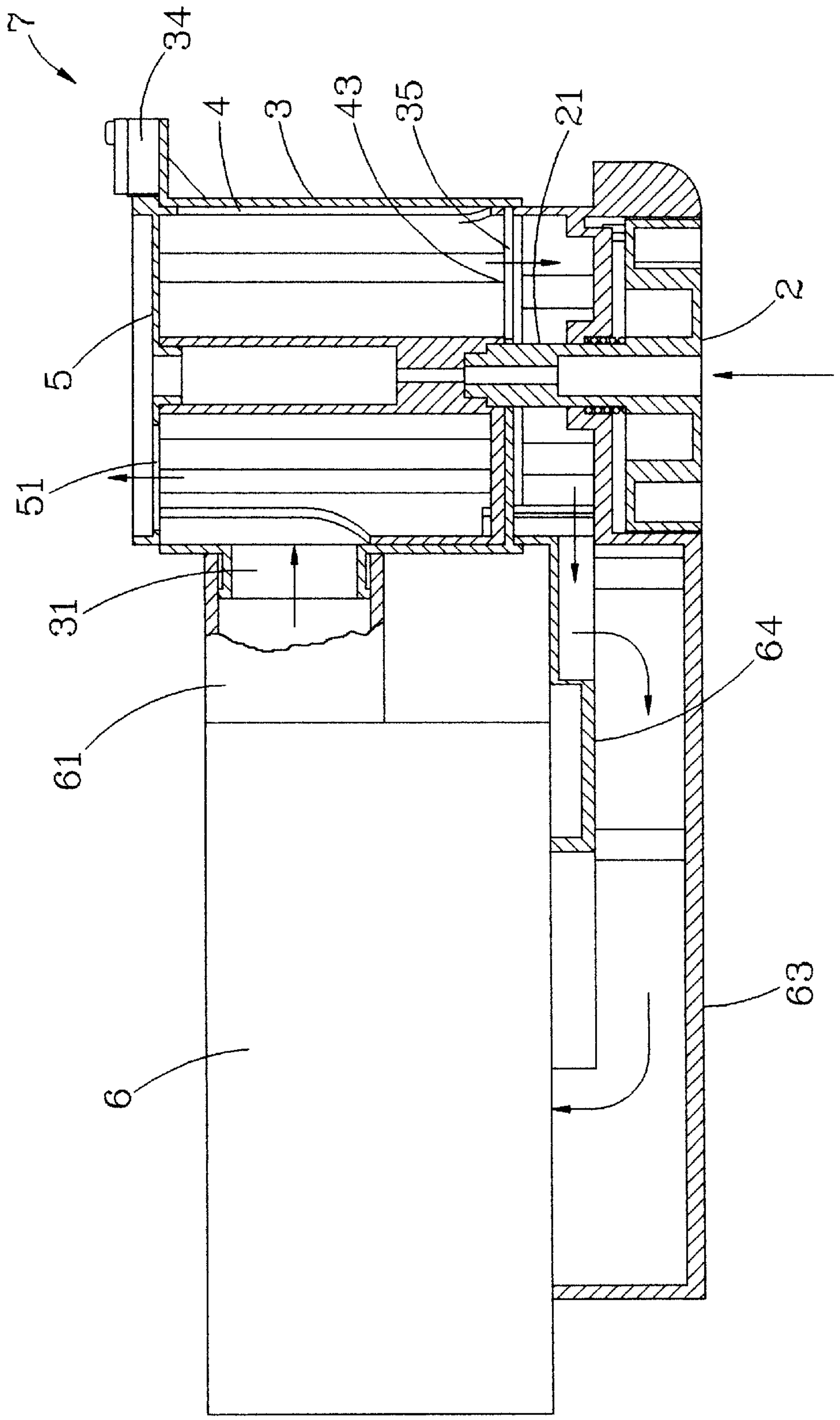
FIG. 7 is another schematic view includes the venting operation of the present invention.

When air is fully inflated in the airbags, when in an emergency condition occurs, a CPR is necessary to be performed, the air within the airbed is necessary to be vented out rapidly. With reference to FIGS. 6, and 7, the user only needs to rotate the rotary element 2 to drive the driving shaft 21 so that the inner rotary body 4 rotates to a predetermined angle. Then, the air outputted from the wind transfer tube 61 of the blower 6 is guided to an interior of the outer casing 3. Since the first opening 42 at one end of the outer casing 3 is closed, and position of the spacer 41 is changed, it is isolated with the airbed. As a result air only vents out from the openings 51 and 52. The air originally in the airbags of the airbed flows to the interior of the outer casing 3 through the jointing tubes 33. Since the position of the spacer 41 causes that the joint tube 33 is communicated with the second opening 43 and the lower opening 35. Moreover, since the lower opening 35 is connected to the wind suction opening 62 of the blower 6. Thereby, by the blower 6 to suck air, the air in the joint tube 33 can be pumped or drained out quickly.

The sensing switch 34 and a protrusion 53 have the effect of monitoring the condition.

In a prior art airbed, the blower 6 may achieve the object of rapid inflation, while the air cannot be drained out rapidly. However, an emergency rescue must be performed immediately. If the air in the airbags can be vented out rapidly, the patient may have a high possibility to be cured. The present invention integrates the functions of inflation and venting in one unit by only one blower so as to simply the structure and lower the cost.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A rapid inflation and venting air valve comprising a rotary element, an outer casing, an inner rotary body, a rotary cover, and a blower and being placed in a first lateral cover and a second lateral cover; characterized in that:

an inner side of the rotary element is extended with a driving shaft; the driving shaft passes through a predetermined portion of the first lateral cover to be connected to the outer casing;

the outer casing is a hollow tube and; a lateral side of the outer casing has an air inlet and a plurality of jointing tubes; one end of the outer casing is an opening portion; the opposite side with respect to the opening portion is a closing end; the closing end has a plurality of apertures and a through hole;

the inner rotary body has a size slightly smaller than the outer casing; a spacer is installed in a center of the inner rotary body; a first opening and a second opening are formed on one end portion of the inner rotary body; the first opening and the second opening are exactly at two sides of the spacer; a lateral side of the inner rotary body is a shroud and a notch is formed on the shroud; a driving axial hole is formed on the end portion having the first and second openings;

the rotary cover is utilized to cover the inner rotary body; the rotary cover exactly covers the inner rotary body and then the two are assembled as one integral body; the shape of the rotary cover is exactly corresponding to the opening portion of the outer casing; the rotary cover has two cover openings; and the blower has a wind transfer tube and a wind suction opening; a cover plate is used to cover one end of the blower having the wind suction opening; and a wind guide mask is installed aside the cover plate for guiding airflow.

2. The rapid inflation and venting air valve as claimed in claim 1, wherein one edge of the outer casing has a sensing switch, and a protrusion is formed at a predetermined position of the rotary cover; thereby, the sensing switch detects one condition of the air valve by sensing a condition of the protrusion.

3. A rapid inflation and venting air valve as claimed in claim 1, wherein when the wind transfer tube is communicated with the air inlet and the joint tubes, air is inflated into airbags; when the wind suction opening is communicated with the apertures and the joint tubes, air is vented out.

* * * * *